United States Patent
Long et al.

(10) Patent No.: US 10,592,667 B1
(45) Date of Patent: *Mar. 17, 2020

(54) METHODS AND APPARATUS FOR DETECTING MALWARE SAMPLES WITH SIMILAR IMAGE SETS

(71) Applicant: INVINCEA, INC., Fairfax, VA (US)

(72) Inventors: Alexander Mason Long, Sterling, VA (US); Joshua Daniel Saxe, Washington, DC (US)

(73) Assignee: Invincea, Inc., Reston, VA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/845,231

(22) Filed: Dec. 18, 2017

Related U.S. Application Data

(63) Continuation of application No. 15/614,060, filed on Jun. 5, 2017, now Pat. No. 9,852,297, which is a continuation of application No. 15/343,844, filed on Nov. 4, 2016, now Pat. No. 9,672,358.

(60) Provisional application No. 62/250,821, filed on Nov. 4, 2015.

(51) Int. Cl.
*G06F 21/56* (2013.01)
(52) U.S. Cl.
CPC .................. *G06F 21/565* (2013.01)
(58) Field of Classification Search
CPC ....................................... G06F 21/565
See application file for complete search history.

(56) References Cited

U.S. PATENT DOCUMENTS

| | | | | |
|---|---|---|---|---|
| 8,676,725 B1 * | 3/2014 | Lin | ...................... | G06N 99/005 706/12 |
| 8,719,100 B1 * | 5/2014 | Flemings | ........... | G06Q 30/0241 705/14.69 |
| 8,904,525 B1 * | 12/2014 | Hodgman | ............. | G06F 21/562 726/22 |
| 9,672,358 B1 * | 6/2017 | Long | ...................... | G06F 21/565 |
| 9,852,297 B1 | 12/2017 | Long et al. | | |

(Continued)

OTHER PUBLICATIONS

Saxe et al., "Deep Neural Network Based Malware Detection Using Two Dimensional Binary Program Features", IEEE, Electronic ISBN: 978-1-5090-0319-8, Date of Conference Oct. 20, 2015, Published Feb. 25, 2016 (Year: 2015).*

(Continued)

*Primary Examiner* — Chau Le
(74) *Attorney, Agent, or Firm* — Cooley LLP

(57) ABSTRACT

An apparatus can include a processor that can extract, from an input binary file, an image data structure, and can scale the image data structure to a predetermined size, and/or modify the image data structure to represent a grayscale image. The processor can calculate a modified pixel value for each pixel in the image data structure, and can define a binary vector based on the modified pixel value for each pixel in the image data structure. The processor can also identify a set of nearest neighbor binary vectors for the binary vector based on a comparison between the binary vector and a set of reference binary vectors stored in a malware detection database. The processor can then determine a malware status of the input binary file based on the set of nearest neighbor binary vectors satisfying a similarity criterion associated with a known malware image from a known malware file.

21 Claims, 8 Drawing Sheets

(56) References Cited

U.S. PATENT DOCUMENTS

| | | | |
|---|---|---|---|
| 2005/0166268 A1* | 7/2005 | Szor | G06F 21/566 726/24 |
| 2009/0007077 A1* | 1/2009 | Musuvathi | G06F 11/3688 717/130 |
| 2011/0047620 A1* | 2/2011 | Mahaffey | G06F 21/564 726/23 |
| 2012/0121194 A1* | 5/2012 | Yagnik | G06F 17/3002 382/225 |
| 2016/0156460 A1* | 6/2016 | Feng | H04L 9/30 713/168 |
| 2016/0224787 A1* | 8/2016 | Guy | G06F 3/04817 |

OTHER PUBLICATIONS

Office Action for U.S. Appl. No. 15/614,060, dated Jul. 13, 2017, 6 pages.

Long, A. et al., "Detecting Malware Samples with Similar Image Sets," in Proceedings of the Eleventh Workshop on Visualization for Cyber Security, 2014, pp. 88-95.

Han et al., "Malware Analysis Using Visualized Image Matrices", Retrieved from Internet, https://www.hindawi.com/journals/tswj/2014/132713/ref/, Published Jul. 2014.

Nataraj, L. et al., "Malware images: visualization and automatic classification," in Proceedings of the 8th International Symposium on Visualization for Cyber Security, 2011, p. 4.

Saxe, J. et al., "Visualization of shared system call sequence relationships in large malware corpora," in Proceedings of the Ninth International Symposium on Visualization for Cyber Security, 2012, pp. 33-40.

* cited by examiner

METHODS AND APPARATUS FOR DETECTING MALWARE SAMPLES WITH SIMILAR IMAGE SETS

CROSS-REFERENCE TO RELATED APPLICATIONS

This application is a continuation application of U.S. application Ser. No. 15/614,060, entitled "Methods and Apparatus for Detecting Malware Samples with Similar Image Sets," filed Jun. 5, 2017, now U.S. Pat. No. 9,852,297, which is a continuation application of U.S. application Ser. No. 15/343,844, filed Nov. 4, 2016, now U.S. Pat. No. 9,672,358, entitled "Methods and Apparatus for Detecting Malware Samples with Similar Image Sets," which claims priority to and the benefit of U.S. Provisional Application Ser. No. 62/250,821, filed Nov. 4, 2015 and entitled "Methods and Apparatus for Detecting Malware Samples with Similar Image Sets," the disclosure of each of which is incorporated herein by reference in its entirety.

GOVERNMENT CONTRACT

This invention was made with government support under Government Contract No. FA8750-10-C-0169, awarded by the Department of the Air Force. The government has certain rights in the invention.

BACKGROUND

Malware detection systems can be configured to detect the presence of malware on compute devices. Some known malware detection systems can use known assets of identified malware samples to determine whether a computer application was likely made by the same entity that created the malware samples, and therefore whether the computer application likely is malware itself. For example, some known malware detection systems compare code of malware samples and computer applications to determine whether the application is malware. Small differences in code can, however, cause such a system to incorrectly determine that the application is not malware. Additionally, it can be difficult to access all portions of the code in a computer application to determine whether the application may be malware. Specifically, some computer applications may, for a variety of reasons, protect the code of the application to prevent others from accessing and reviewing the code. Further, analyzing code alone may not allow a system to identify tactics malware writers use to reach users, and therefore may not allow administrators to draw inferences from the tactics of known malware samples to determine the likelihood that the computer application is also malware. Further, merely analyzing the code may cause difficulties in visualizing the results of analyzing the computer application, such that a malware analyst can later use the results to perform other actions, such as determining where to focus future malware analysis.

Accordingly, a need exists for methods and apparatus that use mechanisms other than code analysis to reduce false negative malware determinations, that analyze potential malware samples when code is not available, and that provide streamlined visualizations of the analysis data to allow analysts to fine-tune malware analysis procedures.

SUMMARY

In some implementations, an apparatus can include a memory and a processor operatively coupled to the memory. The processor can extract, from an input binary file, an image data structure, and can scale the image data structure to a predetermined size. The processor can also modify the image data structure to represent a grayscale image. The processor can calculate a modified pixel value for each pixel in the image data structure, and can define a binary vector based on the modified pixel value for each pixel in the image data structure. The processor can also identify a set of nearest neighbor binary vectors for the binary vector based on a comparison between the binary vector and each reference binary vector from a set of reference binary vectors stored in a malware detection database. The processor can then determine a malware status of the input binary file based on the set of nearest neighbor binary vectors satisfying a similarity criterion associated with a known malware image from a known malware file.

DETAILED DESCRIPTION

Figure 1:
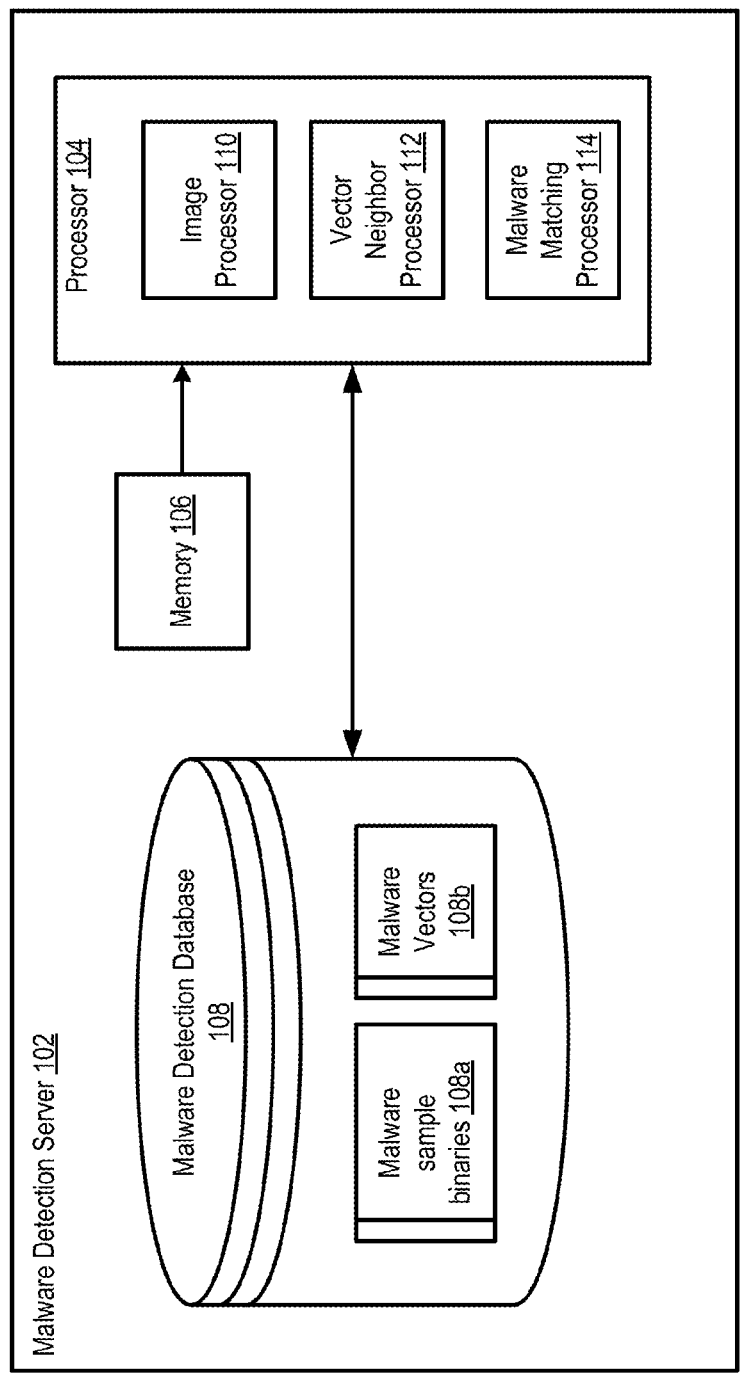
FIG. 1 is a schematic diagram illustrating a malware detection server, according to an embodiment.

In some embodiments, a malware detection server can obtain a set of image assets associated with a potential malware input sample. Such assets can include a desktop icon image, icons and/or images a potential user views while running the potential malware input sample, and/or other images from the potential malware input sample. The malware detection server can normalize the images (e.g., scale images to a predetermined size, scale images to a predetermined resolution, change color images into black-and-white images, etc.), and can generate image binary vectors based on the normalized images. The image binary vectors can be compared with vectors generated for known malware assets (e.g., based on determining the nearest neighbors of each image binary vector and determining distances between that image binary vector and vectors associated with the nearest neighbors). Based on the comparison, the malware detection server can determine a likelihood that the potential malware input sample is malware (e.g., if the vectors match, the malware detection server can determine that the potential malware input sample is likely malware, and/or the like). In such embodiments, malware samples can be analyzed regardless of whether or not the code of the malware samples is available for inspection, can be analyzed substantially in real-time without needing to store malware code and/or similarly large data sets, and can be analyzed to determine information that may remain unknown after analyzing code alone.

In some implementations, an apparatus can include a memory and a processor operatively coupled to the memory. The processor can extract, from an input binary file, an image data structure, and can scale the image data structure to a predetermined size. The processor can also modify the image data structure to represent a grayscale image. The processor can calculate a modified pixel value for each pixel in the image data structure, and can define a binary vector based on the modified pixel value for each pixel in the image data structure. The processor can also identify a set of nearest neighbor binary vectors for the binary vector based on a comparison between the binary vector and each reference binary vector from a set of reference binary vectors stored in a malware detection database. The processor can then determine a malware status of the input binary file based on the set of nearest neighbor binary vectors satisfying a similarity criterion associated with a known malware image from a known malware file.

In some implementations, a process can include extracting an image from an input binary file, and generating an image data structure based on and representing the image. The process can include modifying a size and a set of pixel values of the image data structure, to generate a modified image, and generating a binary vector based on a set of pixel values of the modified image. The process can include calculating a distance between the binary vector and each reference binary vector from a set of reference binary vectors stored in a malware detection database to define a set of distances. The process can further include determining a set of nearest neighbor vectors from the set of reference binary vectors stored in the malware detection database based on the set of distances, and generating a nearest neighbor index for the binary vector based on the set of nearest neighbor vectors. The process can further include calculating a threat score for the input binary file based on the nearest neighbor index, and identifying the input binary file as a malware file when the threat score satisfies a predetermined criterion.

In some implementations, an apparatus can include a memory and a processor operatively coupled to the memory. The processor can receive an input binary file including an image, and can normalize the image to produce a normalized image. The processor can define a pixel vector for the image based on pixels of the normalized image, and can store the pixel vector in a malware detection database. The processor can define a set of pixel vector groups for a set of pixel vectors stored in the malware detection database, such that each pixel vector group from the set of pixel vector groups is associated with a known malware sample, and such that the set of pixel vectors includes the pixel vector of the image. The processor can add each pixel vector group from the set of pixel vector groups to a vector group queue. The processor can, for each pixel vector group in the vector group queue, calculate a distance between each pixel vector in that pixel vector group and a subset of pixel vectors from the set of pixel vectors that are associated with a set of images from the input binary file. The processor can calculate a similarity score for that pixel vector group based on a distance between each pixel vector from that pixel vector group and the subset of pixel vectors associated with the input binary file. The processor can also calculate a threat score for the input binary file based on the similarity score, and can identify the input binary file as a malware file when the threat score satisfies a predetermined criterion.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

FIG. 1 is a block diagram illustrating a malware detection server 102. For example, in some implementations, a malware detection server 102 can include at least one processor 104, at least one memory 106, and at least one malware detection database 108. The memory 106 can be a hardware module and/or component configured to store data accessible by the processor 104, and/or to store code representing executable instructions for the processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 106 stores instructions to cause the processor 104 to execute modules, processes and/or functions associated with a malware detection server 102 and/or system.

The processor 104 can be any hardware module and/or component configured to receive and process data, and/or to execute code representing executable instructions. In some embodiments, the processor 104 can be a general purpose processor, a Field Programmable Gate Array (FPGA), an Application Specific Integrated Circuit (ASIC), a Digital Signal Processor (DSP), and/or the like.

The processor 104 can implement a number of modules and/or server components, including but not limited to an image module 110, a vector neighbor module 112, and a malware matching module 114. The processor 104 can be configured to execute instructions generated by any of the modules and/or server components, and/or instructions stored in the memory 106. In some implementations, if the malware detection server 102 includes multiple processors, the modules and/or server components can be distributed among and/or executed by the multiple processors. The memory 106 can be configured to store processor-readable instructions that are accessible and executable by the processor 104.

In some implementations, the modules and/or server components (e.g., such as modules 110, 112, and 114) can be implemented on and/or executed by the processor 104 (e.g., as software executed on and/or implemented by the processor 104). In some implementations, the modules and/or server components 110, 112, and 114 can be software stored in the memory 106 and executed by the processor 104. In other implementations, the modules and/or server components 110, 112, and 114 can be any assembly and/or set of operatively-coupled electrical components separate from the processor 104 and the memory, including but not limited to field programmable gate arrays (FPGAs) and/or application-specific integrated circuits (ASICs).

The image module 110 can be a module and/or server component configured to normalize (e.g., change the size and/or formatting of) images derived from a potential malware input sample. Specifically, the image module 110 can scale images to a predetermined size, can convert images into greyscale and/or black and white images, can scale the images to a predetermined resolution, can generate binary vectors corresponding to the images and/or the like. Further details of this process can be found in at least FIGS. 3-4, described in further detail herein.

The vector neighbor module 112 can be a module and/or server component configured to determine nearest neighbors for a binary vector of the potential malware input sample. For example, the vector neighbor module 112 can be a module and/or server component configured to compare vectors (e.g., such as binary vectors and/or other vectors) associated with known malware samples to vectors associated with a potential malware input sample, and can make associations between similar vectors. Further details can be found in at least FIGS. 2, 4, and 7, described in further detail herein.

The malware matching module 114 can be a module and/or server component configured to determine a likelihood that the potential malware input sample is malware. For example, the malware matching module 114 can be configured to compare a set of vectors (e.g., binary vectors and/or similar vectors) associated with the potential malware input sample with vector groups associated with known malware samples to identify a likelihood that the potential malware input sample associated with the set of vectors is the known malware sample. In some instances, for example, the malware matching module 114 can combine a result of image analysis with other factors to determine a probability that the input sample is malware. Further details can be found in at least FIG. 4-6, described in further detail herein.

The at least one malware detection database 108 can be a data store and/or memory configured to store multiple records relating to malware sample binaries and/or malware vectors. In some implementations, malware sample binaries can be image files extracted from malware samples. The malware vectors can be data structures including binary information representing the malware sample binaries, e.g., after the malware sample binaries have been processed. Tables in the at least one malware detection database 108 can be distributed across multiple databases, or can be stored in one database. For example, the malware sample binary table 108a can contain records relating to images extracted from malware samples. The records can include images in their original format, and/or can include images processed via the image module 110. A record in the malware sample binary table 108a can include an identifier of the image, an image format identifier, an identifier associated with the malware from which the image was extracted, a date the image was obtained, alternative representations of the image (e.g., a greyscale and/or black-and-white version of the image), and/or other information relating to an image. More information on malware sample image binary records can be found at least in FIG. 3-4, described in further detail herein.

A malware vectors table 108b can include vectors including the pixel values of malware sample binaries stored in the malware sample binary table 108a. For example, a malware vector record can include a vector representing a binary representation of a black-and-white version of a malware sample binary. A record in a malware vectors table 108b can include a malware image vector identifier, a malware image vector, a date and/or time at which the malware image vector was created, and/or other information relating to a malware image vector.

Figure 2:
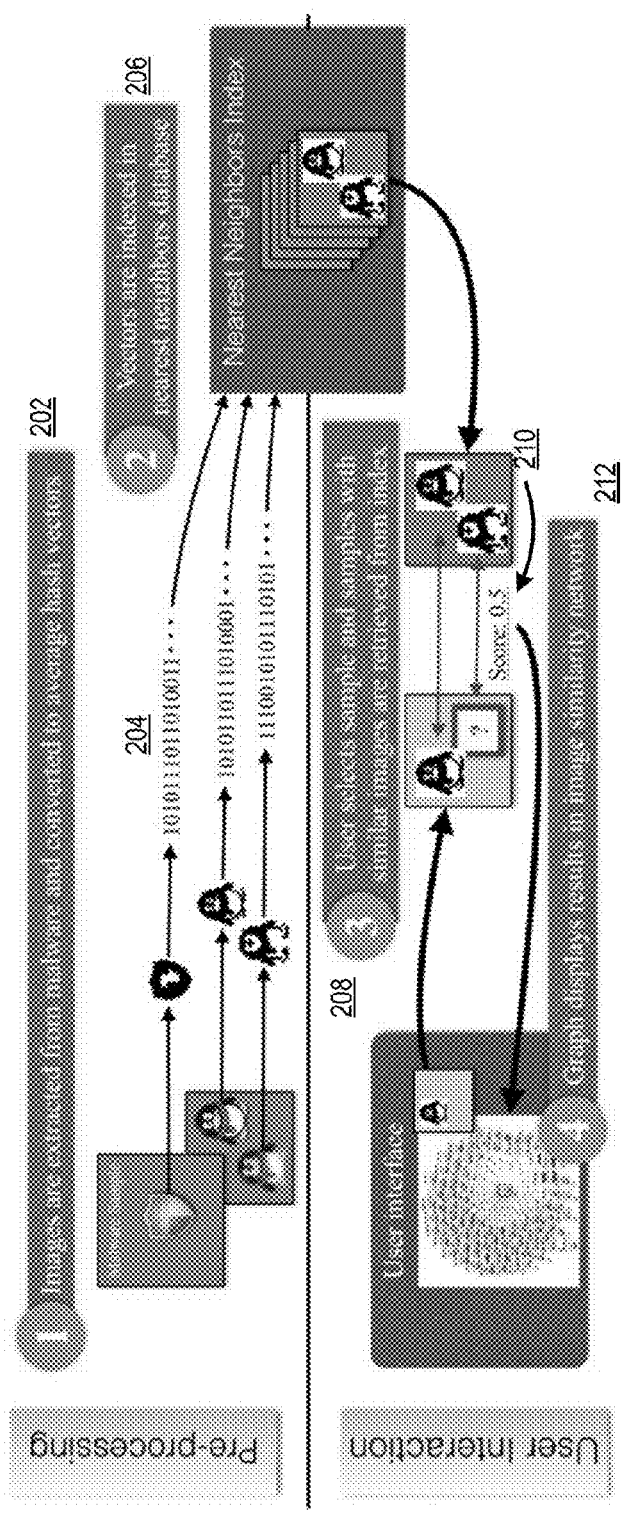
FIG. 2 is a schematic diagram illustrating a method for analyzing images from malware, according to an embodiment.

FIG. 2 is a schematic diagram illustrating analyzing images from potential malware (e.g., using a processor, such as processor 104 in FIG. 1). For example, in some implementations, images can be extracted from a potential malware input sample, at 202. At least some of the images extracted from the potential malware input sample can be converted into binary vectors, at 204 (e.g., using the process shown and described with respect to FIG. 3), each representing pixel values in an image. Each of the binary vectors can be stored in a database (e.g., malware detection database 108), and can be indexed, at 206, based on a determination of their nearest neighbors. Indexing can include determining relationships (e.g., similarities) between the stored binary vectors, storing data relating to the relationships between the stored binary vectors, and/or arranging the stored binary vectors in the malware vectors table 108b based on the determined relationships between the stored binary vectors. A user and/or the malware detection server 102 (e.g., after receiving the potential malware input sample) can then determine, at 208, whether binary vectors of known malware samples and stored in the malware detection database 108 match and/or similar to binary vectors generated from the images from the potential malware input sample. In some implementations, binary vectors can match when a similarity score, at 210, (e.g., calculated at least in part based on a distance between the binary vectors) falls above a predetermined threshold, and/or the like. The malware detection server 102 can generate a graph, at 212, and/or a similar visualization (e.g., a table, and/or the like) to show which binary vectors match each other (e.g., based on the calculated similarity scores).

Figure 3:
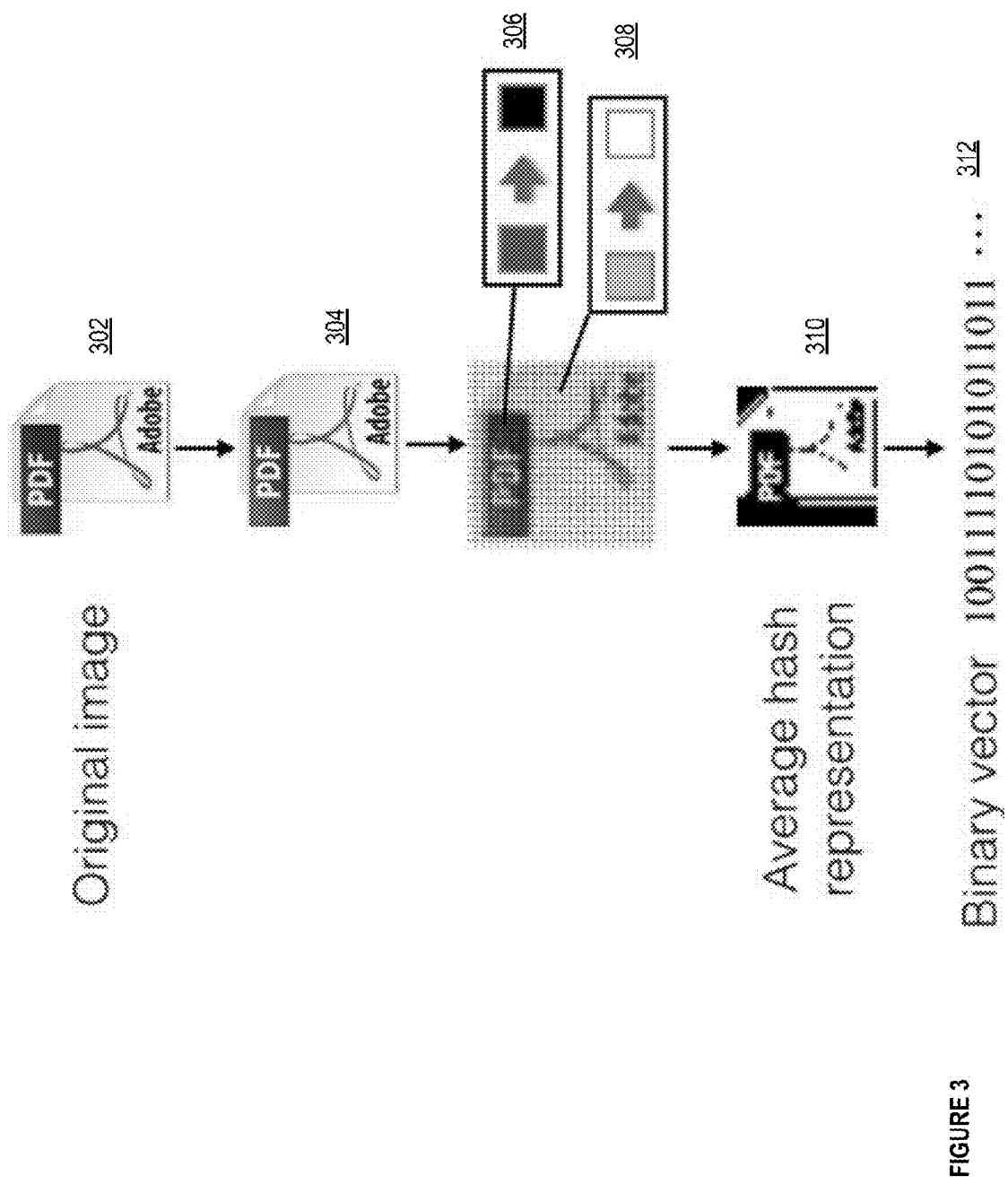
FIG. 3 is a flow diagram illustrating processing images to generate image binary vectors, according to an embodiment.

FIG. 3 is a flow diagram illustrating processing images to generate image binary vectors. In some implementations, for example, the original image 302 can be a color image (e.g., an icon, a photograph, and/or a similar image asset) used in the potential malware input sample (e.g., in the interface of the potential malware input sample, and/or the like). The original image 302 can be converted to a greyscale image 304 (e.g., using the image module 110). The image module 110 can also determine an average pixel value for the image (e.g., by adding the pixel value of each pixel in the greyscale image 304 and dividing the sum by the total number of pixels in the greyscale image 304). To convert the image into a black-and-white image (e.g., to generate an average hash representation 310), the image module 110 can change the value of the pixels having a pixel value above the average pixel value to be black 308, and can change the value of the pixels having a pixel value below the average pixel value to be white 308. The resulting black-and-white image 310 can further be represented as a binary vector 312 (e.g., by generating a vector including values for each pixel in the image, where black pixels are represented as '0' and white pixels are represented as '1' or vice versa).

While described herein as being calculated based on an average pixel value of an image, in other instances a threshold used to convert an image to a black-and-white image can be predefined, consistent across the images, defined for a group of samples, and/or the like. For example, instead of using an average pixel value for the threshold for that image, the user can predefine a threshold to be used on the images.

Figure 4:
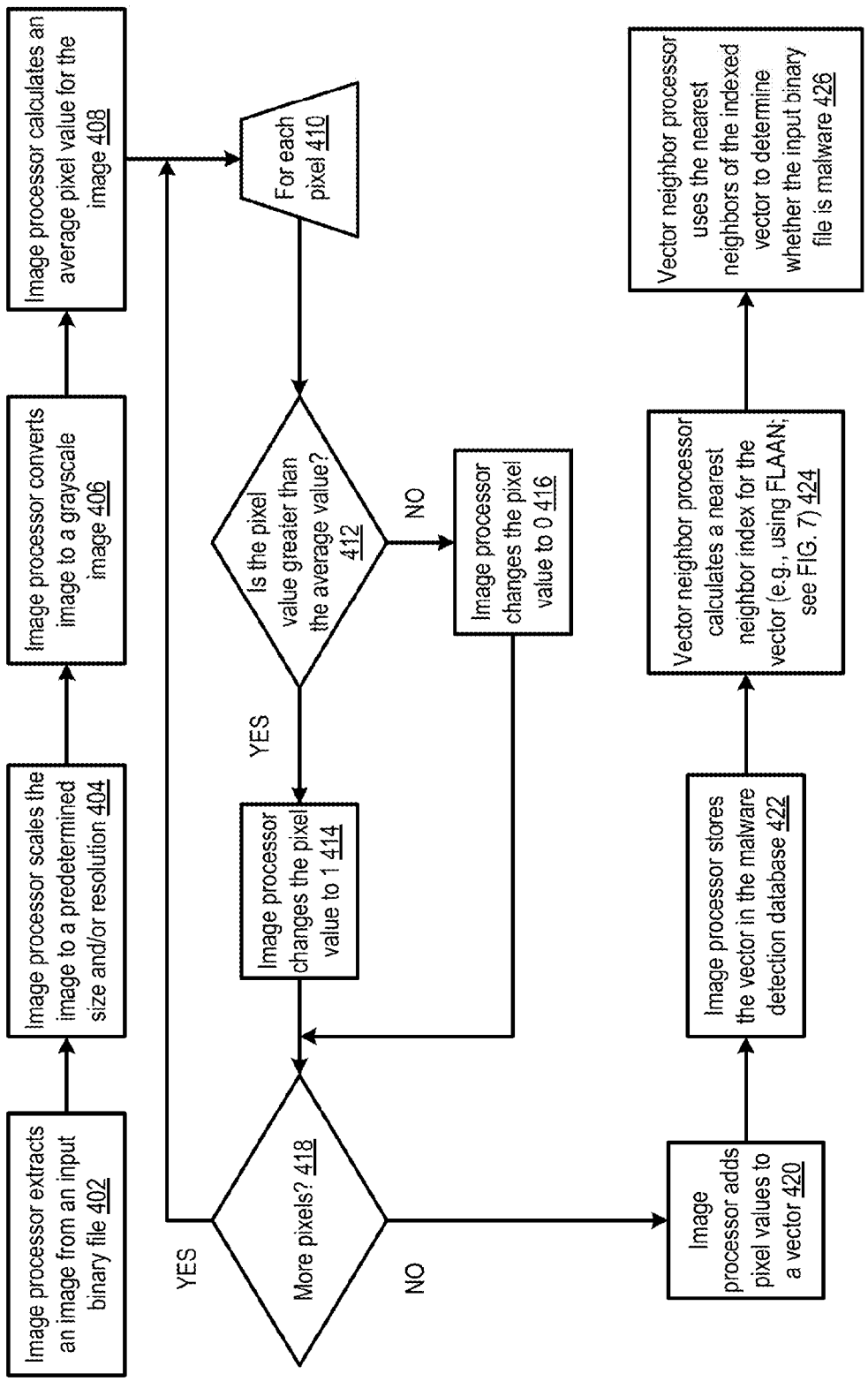
FIG. 4 is a logic flow diagram illustrating processing image binary vectors, according to an embodiment.

FIG. 4 is a logic flow diagram illustrating processing image binary vectors. For example, in some implementations, the image module 110 can extract, at 402, at least one image from an input binary file (e.g., a potential malware input sample). The image can be, for example, an icon used in a user interface of the potential malware input sample, a desktop and/or start menu icon, a graphic generated by the potential malware input sample, and/or a similar image obtained from the potential malware input sample. In some implementations, the image can be an image data structure representing the icon and/or similar graphic (e.g., an image data structure to be stored in the malware sample binary table 108*a* of the malware detection database 108). In other implementations, the image module 110 can generate an image data structure including and/or representing the image. For example, the image module 110 can instantiate a new image data structure including a newly-generated identifier for the image data structure, an image format identifier, a date the image was obtained, the image (e.g., the image data, a representation of the image, such as a two-dimensional array including the pixel values of the original image, and/or the like), and/or other information relating to the image. The image module 110 can normalize the image (or the image data structure), for example, by scaling, at 404, the image to a predetermined size and/or resolution (e.g., to modify each image to include the same and/or a similar number of pixels), and/or by converting, at 406, the image to a grayscale image (e.g., by modifying pixels in the image data structure such that the image data structure represents a grayscale image). The image module 110 can then calculate, at 408, an average pixel value for the image (e.g., by calculating a sum of the pixel values of each pixel in the grayscale image and dividing the sum by the total number of pixels in the grayscale image).

For each pixel in the image, at 410, the image module 110 can determine, at 412, whether or not the pixel value of that pixel is greater than or less than the average pixel value. When the pixel value is greater than the average pixel value, the image module 110 can change, at 414, the pixel value of the pixel to '1'. When the pixel value is less than the average pixel value, the image module 110 can change, at 416, the pixel value of the pixel to '0'. The image module 110 can then check to see if there are additional pixels, at 418, to analyze, and can continue to modify the remaining pixels in a similar manner. When each of the pixels in the image has been processed, the image module 110 can add, at 420, each of the modified pixel values to a vector (e.g., a binary vector, also referred to herein as a pixel vector), such that the vector includes a value for each pixel in the image. In this manner, the binary vector can be defined based on the modified pixel values in the image. The image module 110 can then store, at 422, the binary vector (e.g., in the malware vectors table 108*b* of the malware detection database 108 of FIG. 1). In other implementations, a pixel can be modified based on a determination of whether or not the pixel exceeds a predetermined pixel value (where the predetermined pixel value is not an average pixel value), a determination of whether or not the pixel is included in a foreground or background portion of the image, and/or based on similar criteria. In other implementations, pixels can be changed to different values based on the criteria being used. For example, in other implementations, a pixel can be changed to a '1,' a '0,' and/or a non-binary pixel value if the pixel value of the pixel satisfies a criterion.

The vector neighbor module 112 can use the binary vector of the image to calculate, at 424, a nearest neighbor index for the binary vector. For example, in some implementations, the vector neighbor module 112 can calculate an index value to associate with the binary vector and which can indicate a potential relationship (e.g., similarities) between the binary vector and other binary vectors (e.g., reference binary vectors that are stored in the malware detection database 108). As one example, in some implementations, the vector neighbor module 112 can index the binary vector and the other binary vectors stored in the malware detection database 108. Specifically, each of the binary vectors can be indexed based on comparing values in the binary vectors, and/or the like. Each binary vector can then be assigned a consecutive index value (e.g., based on an order of the binary vectors that is created by indexing the binary vectors) that can be used to determine the relative similarity between one binary vector and another binary vector. For example, binary vectors determined as nearest neighbors in the malware detection database 108 can include consecutive and/or close index values. These binary vectors (also referred to herein as nearest neighbor binary vectors) can therefore be identified by determining a set of binary vectors that include index values that are consecutive and/or close to an index value of the binary vector of the image.

Figure 6:
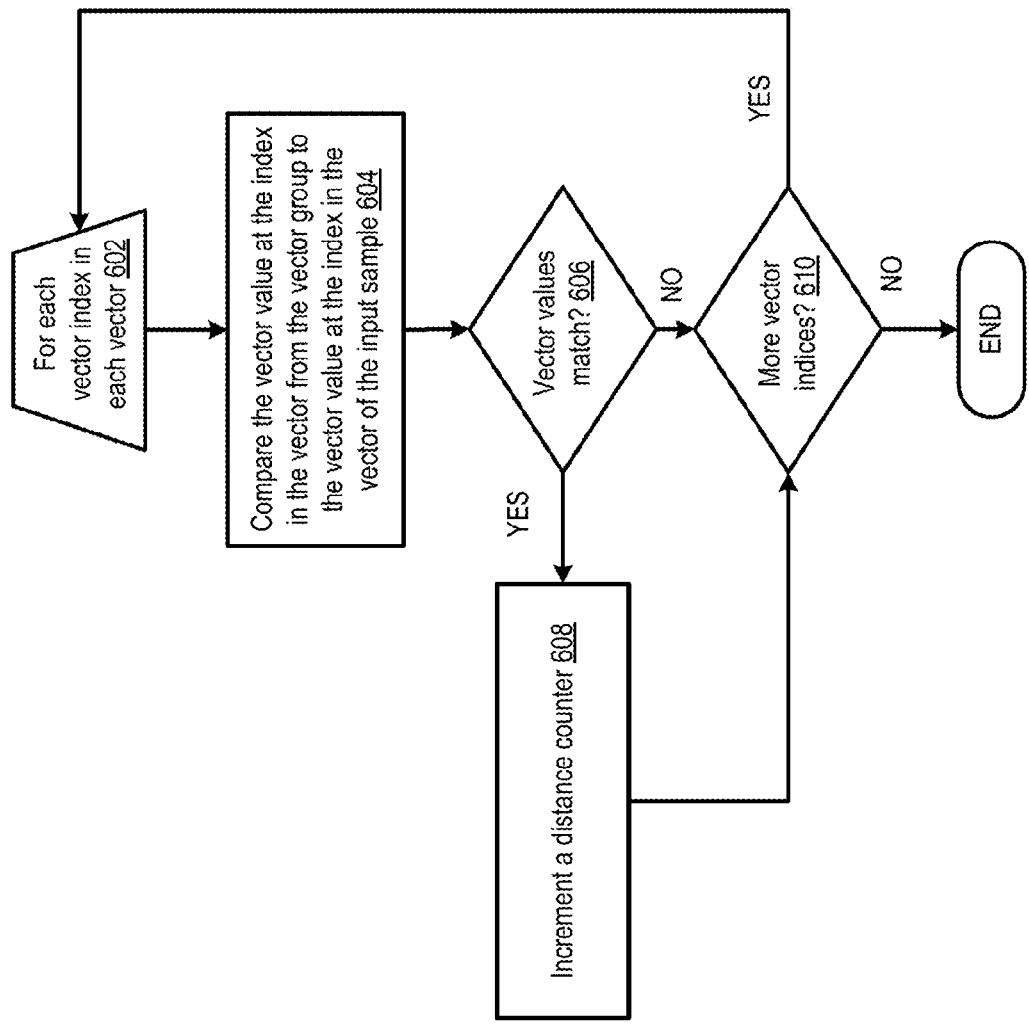
FIG. 6 is a logic flow diagram illustrating calculating distances between image binary vectors, according to an embodiment.
Figure 7:
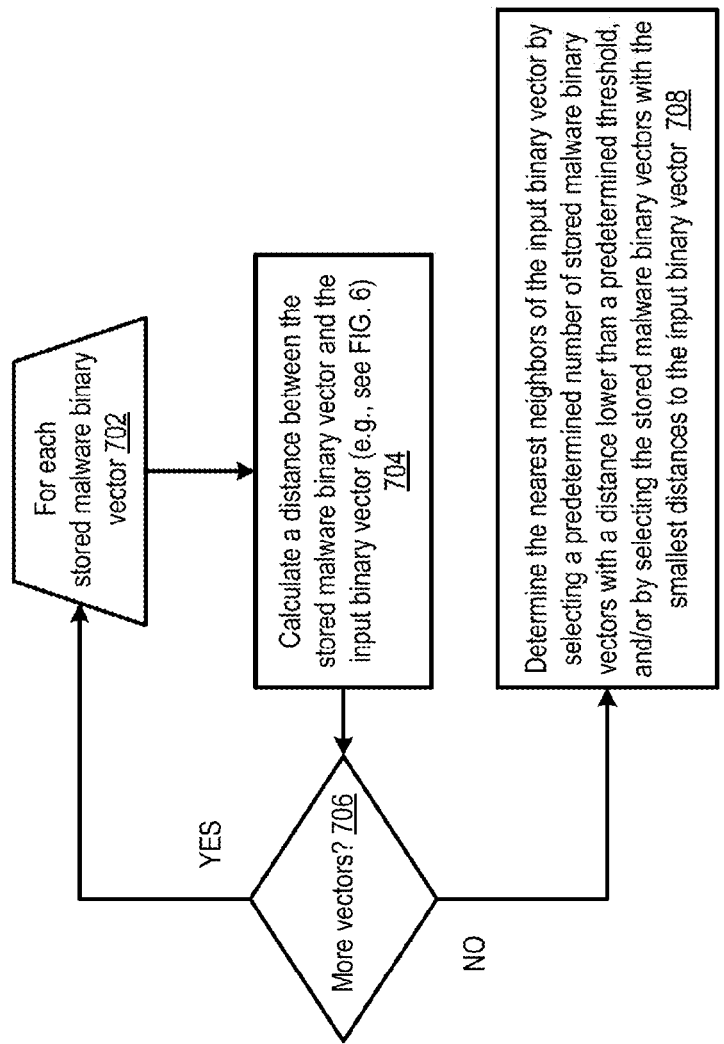
FIG. 7 is a logic flow diagram illustrating calculating nearest neighbors for image binary vectors, according to an embodiment.

Referring to FIG. 7, in some implementations, vectors stored in the malware detection database 108 can be indexed based on distances calculated between the binary vectors (e.g., to determine similarities between the vectors). For example, at 702, for each stored malware binary vector in the malware detection database 108, the malware matching module 114 can, at 704, calculate a distance (e.g., a Hamming distance) between that stored malware binary vector, and the binary vector associated with the input binary file (e.g., an input binary vector; see FIG. 6 for further details with respect to calculating distances between vectors). The malware matching module 114 can then, at 706, check to determine whether there are more stored malware binary vectors to analyze. If so, the malware matching module 114 can continue to calculate distances between the remaining stored malware binary vectors, and the binary vector of the input binary file. When the stored malware binary vectors have been analyzed, the vector neighbor module 112 can, at 708, determine the nearest neighbors of the binary vector (e.g., by selecting a predetermined number of stored malware binary vectors with a distance lower than a predetermined threshold, and/or by selecting stored malware binary vectors with the smallest distances to the binary vector of the input binary file).

The vector neighbor module 112 can then index the binary vector (e.g., using the indexing strategies described above) to relate the binary vector to the selected stored malware binary vectors. For example, the vector neighbor module 112 can assign consecutive index values to the binary vector and the stored malware binary vectors, and/or can otherwise assign index values to the binary vector and the stored binary vectors so as to indicate that the selected stored malware binary vectors are neighbors of the binary vector. Returning to FIG. 4, the vector neighbor module 112 and the malware matching module 114 can then use the indexed binary vector to determine, at 426, (alone or in combination with other factors) whether the input binary file (e.g., potential malware input sample) is malware.

In other implementations, instead of calculating a nearest neighbor index, the vector neighbor module 112 can, substantially in real-time, organize and/or process the binary vectors such that the malware matching module 114 can infer the nearest neighbors of each binary vector based on distances between the binary vectors. In some implementations, the vector neighbor module 112 can use Fast Library for Approximate Nearest Neighbors (FLAAN) techniques to determine the nearest neighbors of the binary vector. For example, in some instances, a Hamming function can be used to calculate a distance between two binary vectors (i.e., a received input sample and a stored known sample). Hamming distances (i.e., the distance computed by the Hamming function) can be calculated for each binary vector from a set of binary vectors stored in the malware detection database 108 as compared to the binary vector of the input sample. A FLANN function can then use the Hamming distances to identify the nearest neighbors to the input sample. In other implementations, other suitable processes, such as, for example, a pHash function, a scale-invariant feature transform (SIFT) function and/or the like, can be used to determine the nearest neighbors of the binary vector. In other implementations, other distance functions such as, for example, a Euclidean distance function, a Manhattan distance function, a Jaccard index function, and/or the like can be used instead of or in addition to the Hamming function. The binary vector can then store identifiers associated with the identified nearest neighbors, and/or the like, such that the vector neighbor module 112 does not index the binary vectors in the malware detection database 108, and such that the vector neighbor module 112 does not assign consecutive and/or otherwise assign index values to each binary vector.

In some implementations, some stored binary vectors can be associated with at least one known malware file. For example, stored binary vectors can be generated from at least one image of at least one known malware file, and/or can be binary vectors previously identified as being associated with at least one known malware file. The vector neighbor module 112 and the malware matching module 114 can therefore determine to which known malware file (if any) a binary vector may be related, e.g., when the vector neighbor module 112 uses the indexed binary vector to determine nearest neighbor binary vectors (e.g., stored binary vectors that are within a predetermined distance of the binary vector), and when the malware matching module 114 performs subsequent similarity analysis (as described in FIG. 5), using similarity criteria, to determine a potential match to known malware files associated with the nearest neighbor binary vectors.

Figure 5:
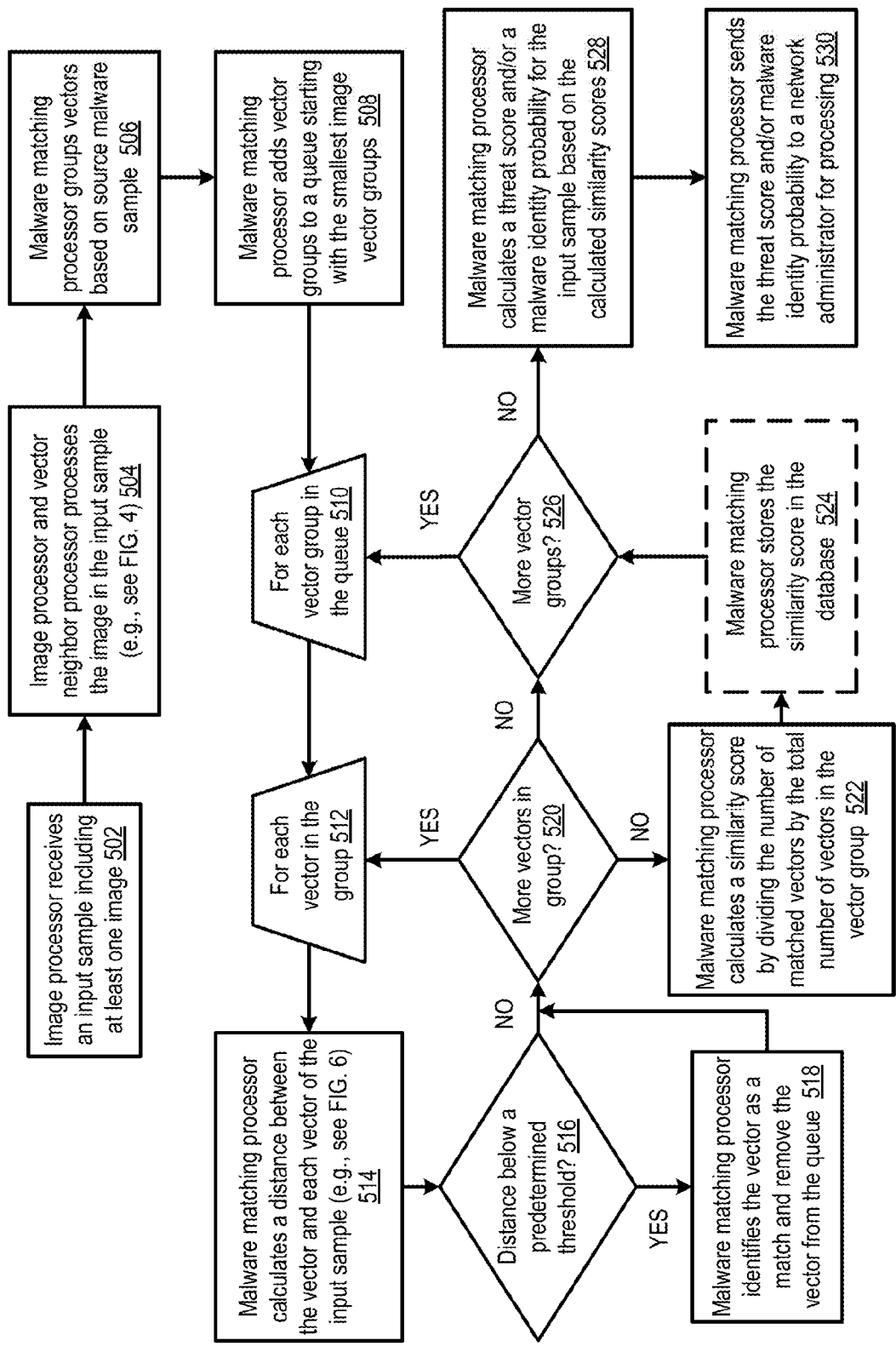
FIG. 5 is a logic flow diagram illustrating calculating a malware threat score using image binary vectors, according to an embodiment.

FIG. 5 is a logic flow diagram illustrating calculating a malware threat score using image binary vectors. In some implementations, an image module 110 can receive an input sample including at least one image, at 502. The image module 110 and the vector neighbor module 112 can process, at 504, the image in the input sample in a manner similar to the processes described in FIG. 4, so as to generate a binary vector for the image in the input sample. The malware matching module 114 can group, at 506, binary vectors (e.g., based on the source sample from which the binary vectors were derived). For example, if malware sample A includes images X, Y, and Z, the binary vectors generated from images X, Y, and Z can be grouped together, as they are each derived from malware sample A.

The malware matching module 114 can add, at 508, vector groups (also referred to herein as binary vector groups and/or pixel vector groups) to a vector processing queue (also referred to herein as a binary vector group queue and/or a vector group queue), for example, starting with the smallest image vector groups. For example, a vector group including three binary vectors can be added to the vector processing queue before a vector group including five binary vectors. In some implementations, a data structure representing the vector group, with references to each binary vector of the vector group, can be added to the vector processing queue. In other implementations, the binary vectors can be added to the vector processing queue in batches, in which the binary vectors of one vector group are added before vectors from another vector group are added. For each vector group in the vector processing queue, at 510, the malware matching module 114 can analyze each binary vector in that vector group to determine similarities between the binary vector of the input sample, and binary vectors in the vector group (and consequently, similarities between the input sample and the source malware sample associated with the vector group).

For example, for each binary vector in a vector group, at 512, the malware matching module 114 can calculate, at 514, a distance between the binary vector from the vector group, and the binary vector associated with the input sample. FIG. 6, for example, illustrates a logic flow diagram of an example method of calculating distances between image binary vectors. In some implementations, for each vector index of each binary vector, at 602, the malware matching module 114 can compare, at 604, the value at the vector index in the binary vector from the vector group, to the value at the vector index in the binary vector associated with the input sample. When the values match (e.g., are the same value), at 606, the malware matching module 114 can determine, at 610, if there are additional values in the binary vectors to check, and can continue to compare values in the vectors. If values at one of the vector indexes are different, the malware matching module 114 can increment, at 608, a distance counter. When each value in the two binary vectors has been compared, the final value of the distance counter can be used to calculate a similarity score and/or other scores associated with the two binary vectors (e.g., based on comparing the final value of the distance counter to one or more criteria and/or thresholds). Similarly stated, the malware matching module 114 can calculate the distance between vectors based on calculating the number of differences between the vectors, and can use this distance calculation to perform other calculations. While the processes described herein generally relate to a Hamming distance, it should be understood that other distance calculations (e.g., standard vector distance formulas, and/or the like) can also be used to determine a distance between the two binary vectors. Additionally, the malware matching module 114 can calculate values other than the distance between the two binary vectors, for calculating a similarity and/or relationship between the binary vectors.

Returning to FIG. 5, the malware matching module 114 can determine, at 516, whether the value of the distance counter (and/or a similar calculation) meets a criterion (e.g., is less than a predetermined threshold). If the distance counter meets the criterion, the malware matching module 114 can identify, at 518, the binary vector associated with the vector group as a match, and can remove the binary vector from the queue, and/or remove the reference to the binary vector from the vector group. The malware matching module 114 can continue to calculate similar distance counters for other binary vectors in the vector group if the malware matching module 114 determines, at 520, that there are more binary vectors to process in the vector group. When each of the binary vectors of a vector group have been processed, the malware matching module 114 can calculate, at 522, a similarity score for the vector group, for example, by dividing the number of matched binary vectors (e.g., the number of vectors removed from the vector processing queue and/or the vector group) by the total number of binary vectors originally in the vector group. Said another way, the malware matching module 114 can calculate a ratio of pixel vectors in that pixel vector group matching the subset of pixel vectors to a total number of pixel vectors in the pixel vector group. The malware matching module 114 can use the similarity score to calculate a threat score, and/or other data, relating to the input sample. The similarity score can, for example, be stored, at 524, in the malware detection database 108 (e.g., as a record in a table in the database including scores associated with vector groups and/or malware samples in the database).

The malware matching module 114 can then determine, at 526, whether there are other vector groups to process in the vector processing queue. If there are additional vector groups in the vector processing queue, the malware matching module 114 can continue to calculate similarity scores for each vector group in the vector processing queue. If each of the vector groups in the vector processing queue has been processed, the malware matching module 114 can calculate, at 528, a threat score, and/or a malware identity probability, for the input sample, based on each of the calculated similarity scores. The threat score can be a score indicating the probability that the input sample is malware. The malware identity probability can be a probability that the input sample was created by and/or originated from the same entity as an entity that created and/or originated a previously verified and/or identified malware sample. In some implementations, the malware matching module 114 can use the similarity score to calculate the malware identity probability, and the malware identity probability can be used to determine the input sample's threat score (e.g., the likelihood that the input sample is malware). The malware matching module 114 can also send 530 the threat score, and/or the malware identity probability, to a network administrator for processing, and/or can generate visualizations of detected malware based on the threat score and/or malware identity probability.

In some instances, an action can be performed on the input sample based on the threat score. For example, if the threat score satisfies one or more similarity criteria (e.g., the threat score and/or the malware identity probability exceed a predetermined threshold, and/or the like), the network administrator and/or the malware matching module 114 can delete, quarantine, and/or perform other actions on the input sample. The malware matching module 114 can also identify the binary vector associated with the input sample as indicating the existence of malware, and can store the binary vector such that the binary vector can be used in processes similar to those described in FIGS. 4-5 for determining whether other input samples are malware.

In some implementations, the malware matching module 114 can calculate threat scores and/or similar scores for the input sample based a combination of the image similarity scores with other data, such as, for example, whether or not proper extensions are employed for the input sample (e.g., whether or not the malware includes files with folder icons but are actually executable programs, and/or the like), metadata associated with the sample (e.g., an author, date, file length, etc.) and/or the like.

While described above as converting the images to greyscale, in other implementations, instead of calculating binary vectors using greyscale images, the malware detection server 102 can generate a color histogram using the pixel color values of the original images, and can compare color histograms of images associated with malware samples to determine the likelihood that input files are malware and/or have been created by and/or originated from the same entity.

Figure 8:
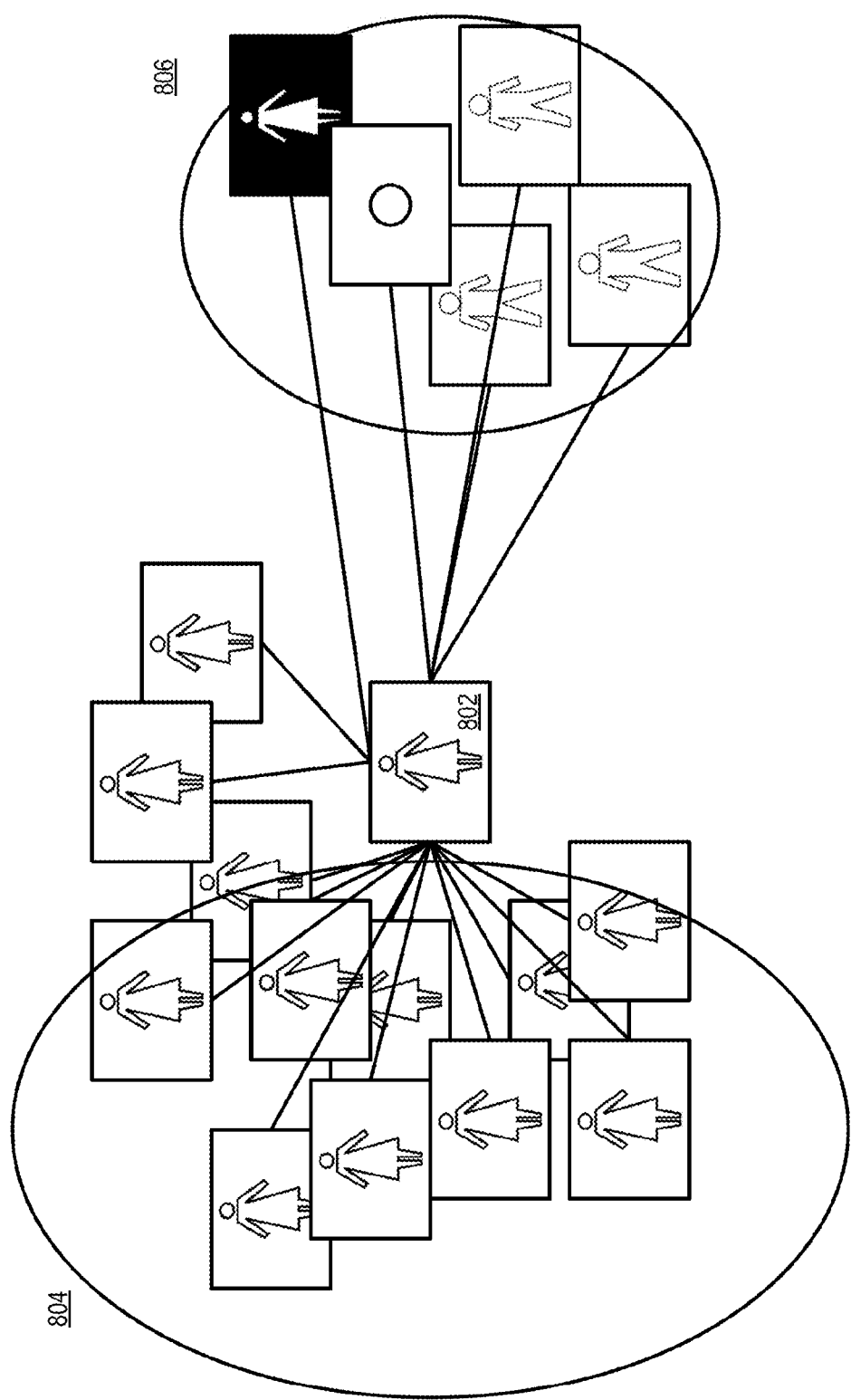
FIG. 8 is a diagram illustrating a graph network representing relationships between data from malware samples and benign samples, according to an embodiment.

FIG. 8 is a diagram illustrating a graph network representing relationships between data from malware samples and benign samples. For example, an image from an input binary file (e.g., such as the input sample and/or the potential malware input sample as described above) 802 can be displayed in a graphic visualization that depicts a graph indicating relationships and/or similarities between images extracted from malware samples. For example, the malware detection server 102 can generate a graphic visualization such that images that have a high similarity score 804 are displayed apart from images with lower similarity scores 806. In some implementations, images can also be displayed with varying distances between an image from the input binary file 802 and other images displayed in the graph. For example, images with high similarity scores (e.g., images that are very similar to the image from the input binary file 802) can be displayed as closer to the image from the input binary file 802 (e.g., as having a smaller distance to the image from the input binary file 802), while images with low similarity scores can be displayed as farther away from the image from the input binary file 802 (e.g., as having a larger distance to the image from the input binary file 802). Images can be shown in their greyscale forms, and/or can be displayed in their original color forms. In other implementations, the images can be visualized in a grid and/or table format (e.g., where cells in the grid include images and associated malware information, and are organized from highest similarity score to lowest similarity score, and/or the like). In other implementations, rather than displaying the images, the graphic visualization can include other information, such as representations of binary vectors generated from each image, and/or other information associated with the images and/or binary vectors. In such implementations, the graphic visualization can display the representations of the binary vectors and/or other information such that the binary vectors and/or other information are grouped based on nearest neighbor indexes, and/or other similarity scores, and such that a network administrator can visually determine whether or not particular binary vectors and/or other information are related to each other, are related to a particular malware file, and/or the like.

While methods and apparatuses described above have been generally described in the context of processing images, in other implementations, the malware detection server 102 can also process audio and/or video files embedded and/or included in input samples. For example, the malware detection server 102 can process an audio file to determine sound frequencies within the audio file and can generate a binary vector of values for the audio file. For example, at a given time in the audio file, if the frequency is above an average frequency of the audio file as a whole, the binary vector can represent the frequency of the given time as '1,' and can conversely represent the frequency as '0' if the frequency at the given time in the audio file is below the average frequency of the audio file (or vice versa). The malware detection server 102 can then compare binary vectors of audio files to calculate similarity scores and/or threat scores, using the processes described in FIGS. 4-5. In other implementations, for video files, the malware detection server 102 can split the video file into a set of frames, where each frame is an image in the video file at a given time in the video file. Each frame image can then be processed and analyzed as described in FIGS. 4-5.

Additionally, while methods and apparatuses described above have generally described modifying and/or normalizing images for processing potential malware binary files, such processes and devices can also modify an image data structure for processing potential malware binary files. For example, instead of normalizing an image (e.g., scaling an image and/or converting the image to grayscale), methods and apparatuses can alternatively normalize data in an image data structure (e.g., can scale a representation of the image in an image data structure, can convert a representation of the image in the image data structure to grayscale, and/or the like). As one example, if the image data structure includes a two-dimensional array of pixel values that represents the image, the image data structure can be normalized by generating a new two-dimensional array of pixel values, wherein the size of the two-dimensional array corresponds to a scaled size of the image being represented in the two-dimensional array. As another example, if the image data structure includes a two-dimensional array of pixel values that represents the image, the image data structure can be normalized by modifying values stored at indices of the two-dimensional array to include grayscale pixel values.

As another example, if the image data structure includes a copy of the image, the image data structure can be normalized by generating a normalized copy of the image (e.g., by scaling the copy of the image in the image data structure, and/or converting the copy of the image into a grayscale image) and storing the normalized copy of the image as a new copy of the image stored in the image data structure, as an additional copy of the image in the image data structure, and/or the like. In this manner, at least one of an image from a potential malware file, or an image data structure generated based on data from the potential malware file, can be modified.

Additionally, while methods and apparatuses described above have been generally described in the context of calculating threat scores or determining malware sources, such processes could also be used to determine, for example, whether artwork was likely created by a similar artist, whether photographs were likely taken within the same location, and/or other such instances where determining relationships between processed images can be useful to extrapolate information about the sources of the images.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

The invention claimed is:

1. A non-transitory processor-readable medium storing code representing instructions to be executed by a processor, the code comprising code to cause the processor to:
   extract an image from an input file;
   generate a vector based on the image;
   for each group of reference vectors from a plurality of groups of reference vectors, define a score by comparing the vector to each reference vector from a plurality of reference vectors in that group of reference vectors using at least one of a Hamming distance, a Euclidean distance, a Manhattan distance, or a Jaccard index between the vector and that reference vector from the plurality of reference vectors in that group of reference vectors;
   calculate a threat score for the input file based on the score for each group of reference vectors from the plurality of groups of reference vectors and metadata associated with the input file; and
   identify the input file as a malware file when the threat score satisfies a predetermined criterion.

2. The non-transitory processor-readable medium of claim 1, wherein the code to cause the processor to generate the vector based on the image includes code to cause the processor to:
   calculate a modified pixel value for each pixel value from a plurality of pixel values in the image, the modified pixel value for each pixel value from the plurality of pixel values being based on an average pixel value of the plurality of pixel values, the vector being based on the modified pixel value for each pixel value from the plurality of pixel values in the image.

3. The non-transitory processor-readable medium of claim 1, further comprising code to cause the processor to:
   scale the image to a predetermined size to define a scaled image data structure, the code to cause the processor to generate the vector includes code to cause the processor to generate the vector based on the scaled image data structure.

4. The non-transitory processor-readable medium of claim 1, further comprising code to cause the processor to:
   define a grayscale image data structure based on the image, the code to cause the processor to generate the vector includes code to cause the processor to generate the vector based on the grayscale image data structure.

5. The non-transitory processor-readable medium of claim 1, further comprising code to cause the processor to:
at least one of delete or quarantine the input file based on identifying the input file as the malware file.

6. The non-transitory processor-readable medium of claim 1, wherein the code to cause the processor to define the score for each group of reference vectors from the plurality of groups of reference vectors includes code to cause the processor to:
compare the at least one of the Hamming distance, the Euclidean distance, the Manhattan distance, or the Jaccard index between the vector and each reference vector from the plurality of reference vectors in that group of reference vectors to a threshold to determine whether that reference vector is a match with the vector; and
define the score for that group of reference vectors based on a ratio of (1) a number of reference vectors from the plurality of reference vectors in that group that are identified as a match with the vector and (2) a number of reference vectors from the plurality of reference vectors in that group that are not identified as a match with the vector.

7. A method, comprising:
receiving, at a processor, an icon image associated with an input file;
defining, at the processor, a representation of the icon image based on a set of pixels of the icon image;
for each group of reference representations from a plurality of groups of reference representations, calculating, at the processor, a similarity score by comparing the representation of the icon image and each reference representation from a plurality of reference representations in that group of reference representations, each reference representation from the plurality of reference representations for that group of reference representations being stored in a malware detection database and associated with an icon image associated with a known malware file;
calculating, at the processor, a threat score for the input file based on the similarity score for each group of reference representations from the plurality of groups of reference representations and a file extension associated with the input file; and
identifying, at the processor, the input file as a malware file when the threat score satisfies a predetermined criterion.

8. The method of claim 7, wherein the similarity score for each group of reference representations from the plurality of groups of reference representations is based on at least one of a Hamming distance, a Euclidean distance, a Manhattan distance, or a Jaccard index between the icon image and each reference representation from the plurality of reference representations in that group of reference representations.

9. The method of claim 7, further comprising:
at least one of delete or quarantine the input file based on the identifying the input file as the malware file.

10. The method of claim 7, wherein the similarity score for each group of reference representations from the plurality of groups of reference representations is based on identifying a set of reference representations from the plurality of reference representations from that group of reference representations as nearest neighbor representations of the representation of the icon image.

11. The method of claim 7, wherein the representation of the icon image is a binary vector based on a set of pixel values of the set of pixels of the icon image, and the plurality of reference representations for each group of reference representations from the plurality of groups of reference representations is a plurality of reference binary vectors.

12. The method of claim 7, wherein the defining the representation of the icon image includes:
calculating a modified pixel value for each pixel value from a set of pixel values of the set of pixels of the icon image, the modified pixel value for each pixel value from the set of pixel values being based on an average pixel value of the set of pixel values, the representation of the icon image including a vector based on the modified pixel value for each pixel value from the set of pixel values of the icon image.

13. The method of claim 7, further comprising:
scaling the icon image to a predetermined size to define a scaled image data structure, the defining the representation of the icon image including defining the representation of the icon image based on the scaled image data structure.

14. The method of claim 7, wherein the calculating the similarity score for each group of reference representations from the plurality of groups of reference representations includes:
comparing a distance between the representation of the icon image and each reference representation from the plurality of reference representations in that group with a threshold to determine whether that reference representation is a match with the representation of the icon image; and
calculating the similarity score for that group of reference representations based on a ratio of (1) a number of reference representations from the plurality of reference representations in that group that are identified as a match with the representation of the icon image and (2) a number reference representations from the plurality of reference representations in that group that are not identified as a match with the representation of the icon image.

15. An apparatus, comprising:
a memory; and
a processor operatively coupled to the memory, the processor configured to define a representation of an image associated with a file,
for each group of reference representations from a plurality of groups of reference representations, the processor configured to calculate a similarity score by comparing the representation of the image and each reference representation from a plurality of reference representations in that group of reference representations, each reference representation from the plurality of reference representations in that group of reference representations being stored in a database and associated with an image associated with a known malware file,
the processor configured to determine a malware status of the file by comparing the similarity score for each group of reference representations from the plurality of groups of reference representations with a similarity criterion.

16. The apparatus of claim 15, wherein the representation of the image is a binary vector based on a plurality of pixel values in the image, the plurality of reference representations in each group of reference representations from the plurality of groups of reference representations is a plurality of reference binary vectors.

17. The apparatus of claim 15, wherein the similarity score for each group of reference representations from the plurality of groups of reference representations is based on at least one of a Hamming distance, a Euclidean distance, a Manhattan distance, or a Jaccard index between the image associated with the file and each reference representation from the plurality of reference representations in that group of reference representations.

18. The apparatus of claim 15, wherein the processor is configured to at least one of delete or quarantine the file based on the malware status identifying the file as malware.

19. The apparatus of claim 15, wherein the similarity score for each group of reference representations from the plurality of groups of reference representations is based on identifying a set of reference representations from the plurality of reference representations from that group of reference representations as nearest neighbor representations of the representation of the image.

20. The apparatus of claim 15, wherein the processor is configured to define the representation of the image by calculating a modified pixel value for each pixel value from a set of pixel values of the image, the modified pixel value for each pixel value from the set of pixel values being based on an average pixel value of the set of pixel values, the representation of the image including a vector based on the modified pixel value for each pixel value from the set of pixel values of the image.

21. The apparatus of claim 15, wherein the processor is configured to calculate the similarity score for each group of reference representations from the plurality of groups of reference representations by:
 comparing a distance between the representation of the icon image and each reference representation from the plurality of reference representations in that group with a threshold to determine whether that reference representation is a match with the representation of the icon image; and
 calculating the similarity score for that group of reference representations based on a ratio of (1) a number of reference representations from the plurality of reference representations in that group that are identified as a match with the representation of the icon image and (2) a number of reference representations from the plurality of reference representations in that group that are not identified as a match with the representation of the icon image.

\* \* \* \* \*